US005863206A

United States Patent [19]

Narusawa et al.

[11] Patent Number: 5,863,206

[45] Date of Patent: Jan. 26, 1999

[54] APPARATUS FOR REPRODUCING VIDEO, AUDIO, AND ACCOMPANYING CHARACTERS AND METHOD OF MANUFACTURE

[75] Inventors: Sadayuki Narusawa; Yoshikatsu Matsubara, both of Shizuoka-ken, Japan

[73] Assignee: Yamaha Corporation, Hamamatsu, Japan

[21] Appl. No.: 522,714

[22] Filed: Sep. 1, 1995

[30] Foreign Application Priority Data

Sep. 5, 1994 [JP] Japan .................................. 6-211615

[51] Int. Cl.[6] ............................ G09B 15/02; G10H 1/36; H04N 5/78

[52] U.S. Cl. ....................... 434/307 A; 434/318; 84/610; 84/477 R; 386/55; 369/32

[58] Field of Search ............................... 434/307 R–309, 434/318, 365; 84/477 R, 601, 603, 609, 610, 625, 630, 631, 634, 645; 369/22, 34, 48, 50, 83, 178, 192, 32; 360/1.9, 33.1, 32, 49, 69, 70, 77.01, 98.04; 348/552, 488, 571, 678; 386/55, 97, 105; 345/141, 143, 147; 381/81

[56] References Cited

U.S. PATENT DOCUMENTS

| | | | |
|---|---|---|---|
| 4,717,971 | 1/1988 | Sawyer | 386/55 |
| 4,796,099 | 1/1989 | Compton | 386/55 |
| 5,194,682 | 3/1993 | Okamura et al. | 434/307 A |
| 5,208,679 | 5/1993 | Yamauchi et al. | 386/105 |
| 5,233,438 | 8/1993 | Funahashi et al. | 386/97 |
| 5,397,853 | 3/1995 | Koguchi | 434/307 A |
| 5,410,097 | 4/1995 | Kato et al. | 434/307 A |
| 5,473,106 | 12/1995 | Miyashita et al. | 434/307 A |
| 5,499,922 | 3/1996 | Umeda et al. | 434/318 X |

*Primary Examiner*—Joe Cheng
*Attorney, Agent, or Firm*—Loeb & Loeb LLP

[57] ABSTRACT

An apparatus for reproducing video, audio and accompanying characters, suitable for use as a sing-along or karaoke apparatus, uses pre-stored display patterns, such as animal figures, instead of video segments. Thus, the apparatus does not have to rely upon the availability of video software that contains song lyrics as well as matching video segments. The apparatus is inexpensive to manufacture since the hardware related to reading and processing an optical image recording disk is not needed. The apparatus also uses the animation patterns on the screen to inform users about the beginning of the music program. Specifically, the changes in the motion and moving speed of display patterns inform the user of the start time of a selected music program. The animation patterns may be displayed during introduction and intermission period, and even during music performance.

22 Claims, 10 Drawing Sheets

APPARATUS FOR REPRODUCING VIDEO, AUDIO, AND ACCOMPANYING CHARACTERS AND METHOD OF MANUFACTURE

BACKGROUND OF THE INVENTION

1. Field of the Invention

The invention relates to an apparatus for reproducing video, audio, and accompanying characters which is also known as a sing-along or karaoke apparatus.

2. Related Art

A conventional sing-along or karaoke apparatus displays the song lyrics of music programs on a television monitor, so a user need not rely on a text card, or the like, to recite the song lyrics with a music. One type of karaoke apparatus uses an optical image recording disk (e.g., a Laser Disk (a registered trademark)) in which video segments are pre-recorded with the song lyrics in the optical image recording disk. However, only the video segments are displayed during the introduction or intermission period. Another type of karaoke apparatus uses a CD graphic (CDG: a compact disk on which performance information and image information are pre-recorded), to display still pictures, coarse moving pictures, or the like. The apparatus uses performance information to generate the background music. Still another type of karaoke apparatus superimposes and displays the words read from a CDG on video segments from a laser disk or a compact disk video. Some karaoke apparatuses display the word "INTRODUCTION" or "INTERMISSION" on a monotone background or on pre-recorded still pictures.

However, the above-described conventional karaoke apparatuses have the following problems. The system that displays only characters (song lyrics) on a monotone background may make the use of the system monotonous and dull. The system that displays video segments corresponding to the music lyrics may be attractive, but relies heavily on the availability of the expensive video software, such as laser disks. The system that superimposes words with an unrelated moving or still picture has a drawback in that the displayed image does not match the meaning of the words. To alleviate this problem, an extensive video library may be needed to match video images with song lyrics. Also, such an apparatus may require an additional control unit to synchronize and control various hardware. This increases the hardware costs. Furthermore, all these apparatuses lack a device or a scheme to inform the user when the music program is about to start.

SUMMARY OF THE DISCLOSURE

In view of the foregoing, it is an object of the invention to provide a method and an apparatus for reproducing music programs that do not use expensive video software, such as laser disks, but still provide attractive animation patterns or pictures during introduction and intermission periods, and during music performance.

It is another objective of the invention to provide a method and an apparatus for reproducing music programs that inform the user of the starting point of the selected music program, and that provide matching pattern movements with song lyrics.

In accordance with an embodiment of the invention, an apparatus for reproducing music programs is suitable for use as a sing-along or karaoke apparatus. The apparatus has a word data storage device, a performance data storage device, a data retrieving device, a display signal producing device, a display control device, a performance signal producing device, and a word signal producing device. The word data storage device stores word data of a plurality of the music programs. The word data includes a word code indicative of words for a segment of a music program. The performance data storage device stores performance data of the music programs. The word data and the performance data storage devices may be in a form of, for example, a read-only-memory. The data retrieving device reads the performance data and the corresponding word data. The display signal producing device has at least one display pattern and produces a display signal comprising an animated display of a selected display pattern of the at least one display pattern. The display control device activates the display signal producing device pursuant to the word code. The performance signal producing device produces a performance signal based on the performance data received from the data retrieving device. In addition, the word signal producing device produces a word display signal based on the word data.

In the preferred embodiment, each display pattern of the at least one display pattern has a plurality of figures. The display signal producing device compiles the figures in a predetermined sequence to produce the animated display. Furthermore, the display signal producing device controls the display position and the display sequence of the selected display pattern. The display control device activates the display signal producing device when the word code contains no words. The word data may further include a selection code which is used by the display signal producing device to choose a display pattern from the at least one display pattern. Consequently, the display control device activates the display signal producing device based on the selection code. The display signal producing device may also select any combination of display patterns pursuant to the selection code.

In accordance with a second embodiment of the invention, the word data of the apparatus may have a time code. The time code has time remaining information which is indicative of the amount of time remaining until the start of the music performance. In this embodiment, the display control device may activate the display signal producing device pursuant to the word code and the time code. In addition, the word signal producing device produces a word display signal based on the word data for a period specified in the time code.

In the further embodiment of the invention, the display control device instructs the display signal producing device to accelerate the display sequence of the at least one display pattern as the time remaining nears zero and to terminate the display signal when the time remaining equals zero.

In accordance with a third embodiment of the invention, the word data may also include a wipe-out code that contains erasure information of the word data. The erasure information of the wipe-out code provides information to the display signal producing device to change the appearance of already performed word data of the selected music program. In this embodiment, the display control device may activate the display signal producing device pursuant to the time code and the wipe-out code. Specifically, the display control device activates the display signal producing device when the wipe-out code is not present.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

This application fully incorporates by reference the following applications: (1) the application entitled "CONTROL DEVICE SUITABLE FOR USE IN AN APPARATUS FOR REPRODUCING VIDEO, AUDIO AND ACCOMPANYING CHARACTERS AND METHOD OF MANUFACTURE" by Tamaru et al., and (2) the application entitled "APPARATUS FOR REPRODUCING VIDEO, AUDIO AND ACCOMPANYING CHARACTERS" by Narusawa et al.

Figure 3:
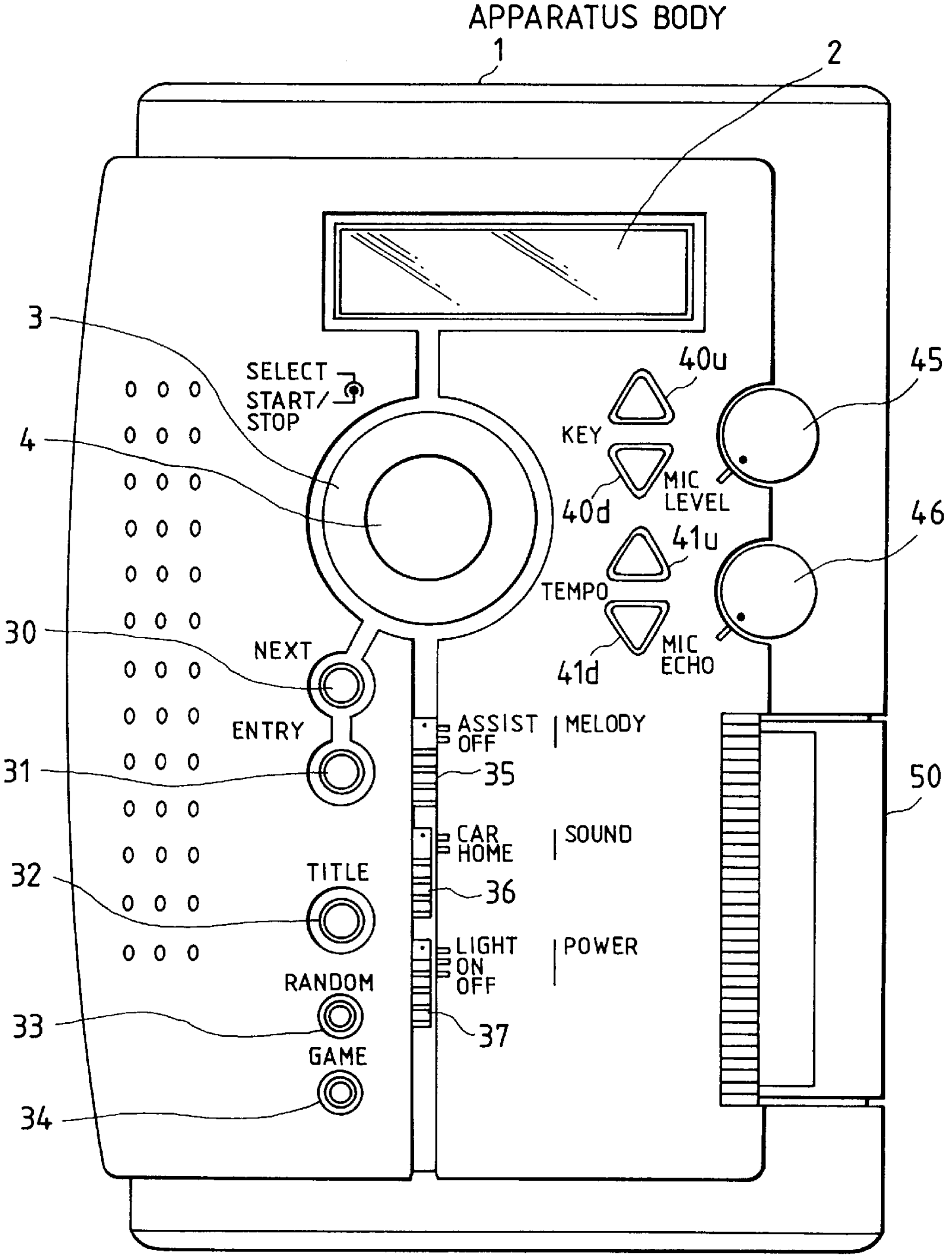
FIG. 3 is a front external view of an apparatus according to an embodiment of the invention.

As shown in the drawings for purposes of illustration, the apparatus according to an embodiment of the invention is typically known as a sing-along or karaoke apparatus. FIG. 3 is a front external view of the karaoke apparatus according to an embodiment of the invention. A liquid crystal display unit 2 is disposed in the upper portion of the front panel of the body 1. A control device is located below the display unit 2. The control device has a selector knob 3 for selecting a music piece and a start/stop button (the center portion) 4 for playing or stopping the music. The arrangement of the above components may be changed pursuant to the design requirement of the invention. When the selector knob 3 rotates, the rotation force is transferred to a rotary encoder (not shown), which is coupled to the selector knob 3. As a result, the rotary encoder produces pulse signals corresponding to the rotation amount. The start/stop button 4 activates a switch (not shown) that produces a start/stop signal.

A read-only-memory (ROM) cartridge 50 shown in FIG. 3 contains a ROM for storing performance information (i.e., musical instrument digital interface (MIDI) information), music piece titles, and the like. For example, the ROM cartridge 50 having fifty music pieces may have corresponding performance information, titles, etc. for all of the fifty music pieces. The ROM cartridge 50 is detachably attached to the body 1 so that different cartridges may be plugged into the body 1.

A next button 30 is a switch that, when activated, skips the preselected music piece and retrieves the next preselected music piece. An entry button 31 is a switch that, when activated, selects and stores preselected information related to a music piece in the karaoke apparatus. A title button 32 is a switch that, when activated, displays the titles stored in the ROM cartridge 50. The ROM cartridge 50 contains displayable information indicative of music titles and other information. A random button 33 is a switch that, when activated, selects music pieces in the ROM cartridge 50 at random. A game button 34 is a switch that, when activated, renders the karaoke apparatus into a game mode for playing such games as naming the title of a music piece, while listening to the music in high-speed, low-speed, or the like.

In the preferred embodiment of the invention, melody switch 35 is used to either activate or deactivate the display of a music melody for a selected music piece. This function is useful to aid the user of the apparatus who does not remember the melody of the music piece. The melody switch 35 may be activated to display the melody of the selected music to assist the user. If the user is familiar with the music melody, the melody switch 35 may be deactivated. A sound switch 36 is used to control the sound quality options, such as reverberation and filter characteristics. In the preferred embodiment, there may be two customized sound quality options for playing the karaoke apparatus either in or outside the car. The karaoke apparatus also has a power switch 37 preferably with three options: "OFF," "ON," and "Light" which energizes the apparatus and turns on the back light of the liquid crystal display unit 2.

The reference numerals 40*u* and 40*d* designate key control switches for changing the key (i.e., the octave) of each music piece. When the key switch 40*u* is activated, a higher key is selected in incremental steps. When the key switch 40*d* is activated, a lower key is selected in decremental steps. The reference numerals 41*u* and 41*d* designate tempo switches for changing the tempo of each music piece. The tempo increases when the tempo switch 41*u* is activated. The tempo decreases when the tempo switch 41*d* is activated. A microphone volume knob 45 adjusts the sound level from a microphone. An echo volume knob 46 controls the degree of echo effects added to the microphone signal.

Figure 4:
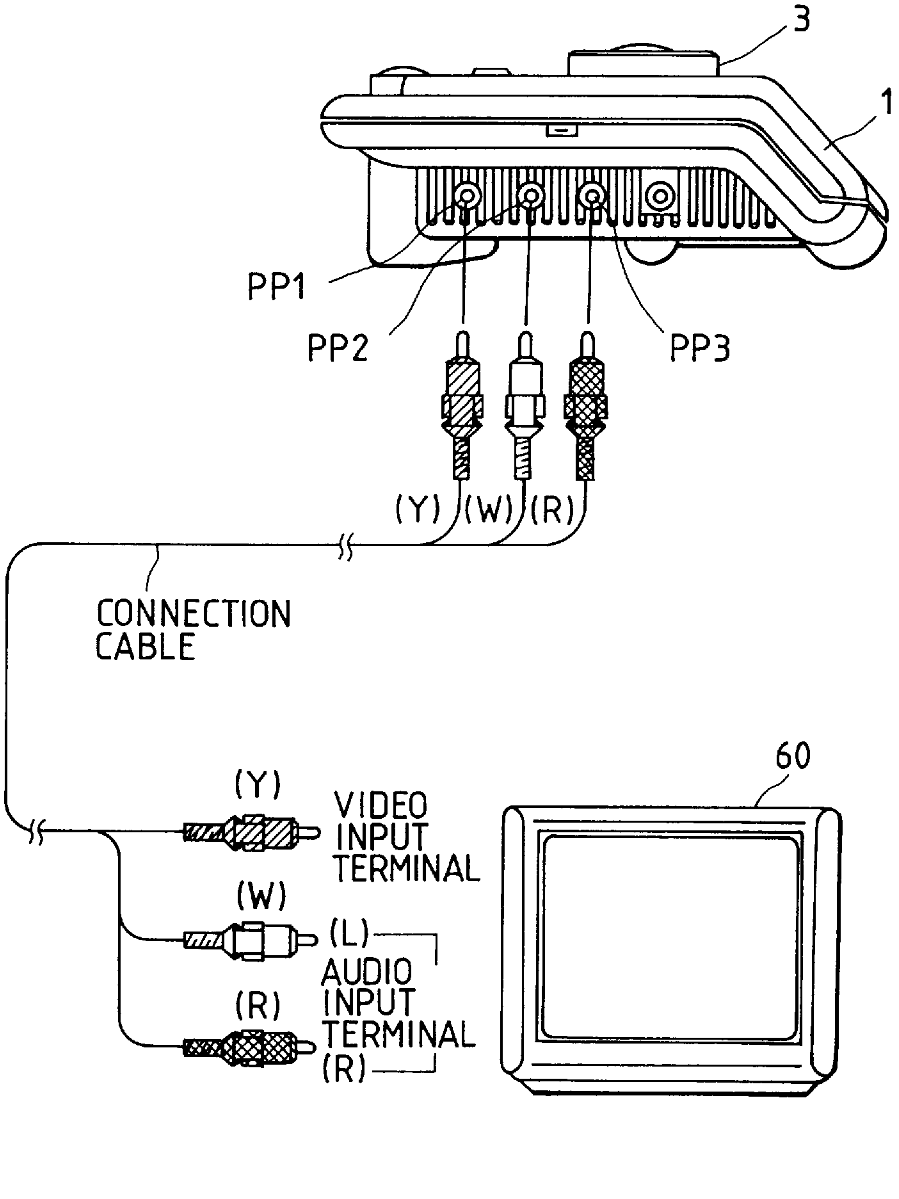
FIG. 4 is a connection diagram showing the interface between an output device and an apparatus.

In FIG. 4, PP1, PP2, and PP3 designate external output terminals of the karaoke apparatus. The terminal PP1 is a video output terminal. The terminals PP2 and PP3 are audio output terminals preferably for left and right channels. The terminals PP1, PP2, and PP3 may be connected to an external output device, such as a television monitor 60, with a set of connection cable.

Figure 1:
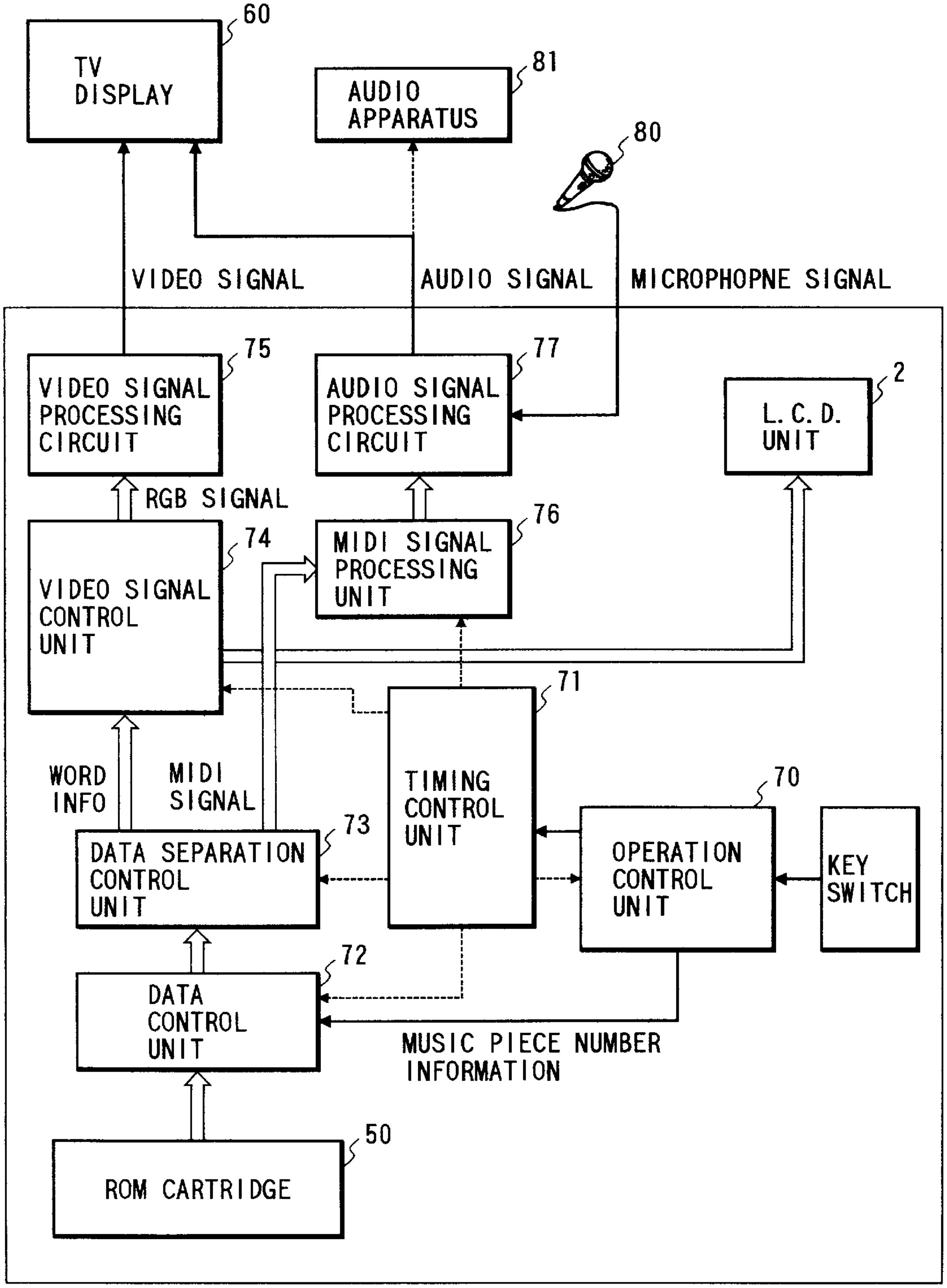
FIG. 1 is a block diagram of an apparatus according to an embodiment of the invention.

FIG. 1 is a block diagram of the karaoke apparatus according to an embodiment of the invention. An operation control unit 70 controls the apparatus in accordance with the input signals from the above-described control switches. When the selector knob 3 rotates, the rotary encoder produces a corresponding pulse signal. Pursuant to the pulse signal, the operation control unit 70 generates and supplies the music piece number information to a data control unit 72. The operation control unit 70 also sends a control signal, based on the input from the control switches, to a timing control unit 71. The data control unit 72 then reads the title information, corresponding to the music piece number information, from the ROM cartridge 50. The data control unit 72 reads a predetermined number of adjacent title information. When a start/stop button 4 is activated, the data control unit 72 reads the performance information and word information of the selected music piece from the ROM cartridge 50. The data read by the data control unit 72 is supplied to a data separation control unit 73. The data separator control unit 73 provides the word information and the title information to a video signal control unit 74. The performance information is transferred to a MIDI signal processing circuit 76.

Figure 5:
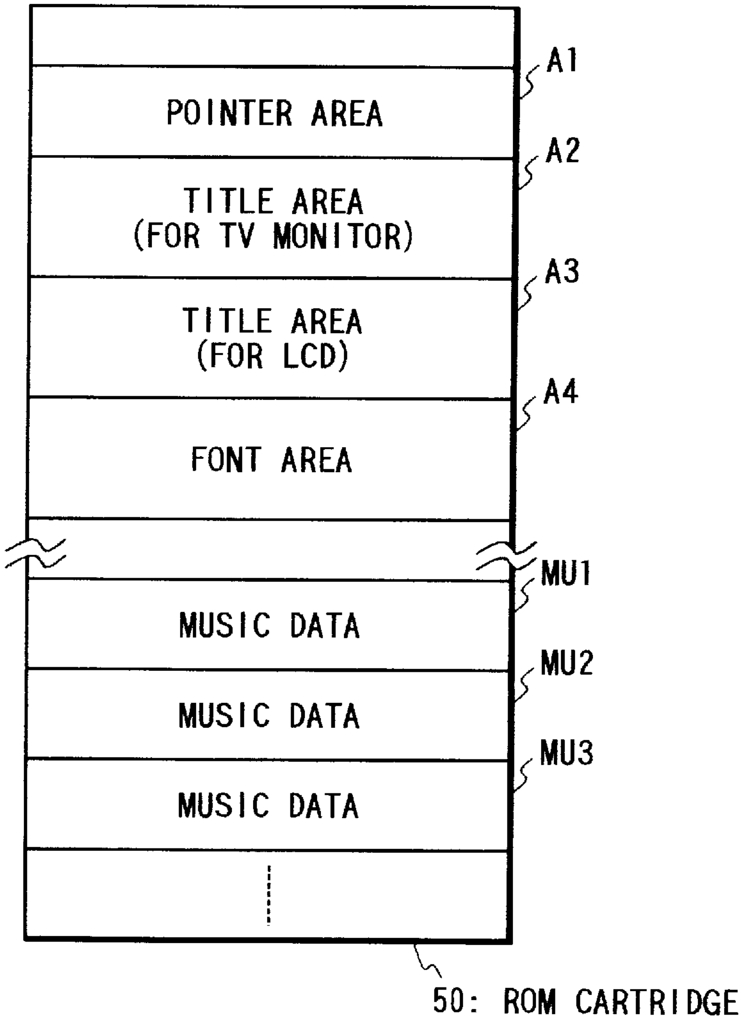
FIG. 5 is a memory map of a ROM cartridge.

The contents of the ROM cartridge 50 used in the karaoke apparatus according to an embodiment of the intervention will now be described. FIG. 5 shows a memory map of the ROM cartridge 50. The title information (including alphanumeric characters and foreign characters, such as kana/kanji characters) to be displayed on a television monitor is stored in a first title area A2. Similarly, the title information for liquid crystal display (including alphanumeric characters and foreign characters, such as katakana characters) of the music pieces is stored in a second title are A3. Font data for displaying special title information on a television monitor, for example, font data not processed by the video signal control unit 74, are stored in a font area A4.

Reference numbers MU1, MU2, and MU3 designate locations where the music data for a first music piece, a second music piece, and a third music piece, respectively, are stored. The term "music data" signifies a set of performance data and corresponding word data. Pointers, (i.e., addresses) indicative of the start addresses of the music data are stored in a pointer area A1.

The MIDI signal processing circuit 76, shown in FIG. 1, produces a musical sound signal by processing the MIDI signal supplied from the data separation control unit 73. The MIDI signal processing circuit 76 then produces the sound signal to an audio signal processing circuit 77. The audio signal processing circuit 77 mixes a voice signal from a microphone 80 with the performance information supplied from the MIDI signal processing circuit 76. The audio signal processing circuit 77 amplifies and produces the mixed signal. The output signal of the audio signal processing circuit 77 is supplied to an audio circuit portion of the television monitor 60 (see FIG. 4). The output signal of the audio signal processing circuit 75 may also be supplied to an audio apparatus 81, such as a stereo amplifier.

In the preferred embodiment, the video signal control unit 74 processes the word information, such as song lyrics, and the title information for television display, and produces an RGB signal of a bit map. The RGB signal is provided to the video signal processing circuit 75. The video signal processing circuit 75 supplies a video signal (preferably, an analog signal) produced from the RGB signal to the television monitor 60. The video signal control unit 74 transfers the title information for liquid crystal display to the liquid crystal display unit 2. Based on the supplied title information, the liquid crystal display unit 2 displays the word information consisting of alphanumeric and/or foreign characters, such as katakana characters.

The video signal control unit 74 will now be described in detail with reference to FIG. 2. A data separation unit 90 separates the supplied word information into various segments, such as text code information SDa, display position information SDb, display/erase timing information SDc, and wipe information SDd. The text code information SDa includes a text code (a character string) which consists of a plurality of words with a predetermined length. During the introduction or intermission period, a text code consisting the characters of "INTRODUCTION" or "INTERMISSION" is written into the text code information SDa. In some instances, a code for selecting an animation pattern may be added to the text code of "INTRODUCTION" or "INTERMISSION." The display position information SDb provides the display position of the text code information SDa. The display position is indicated by (X, Y) coordinate data in which the coordinate represents the start position of the characters (e.g., the top-left corner of the first character). The display/erase timing information SDc consists of time data indicative of the start and erase time of the text code information SDa. The wipe information SDd controls the coloring of the displayed words during the performance of a selected music piece. The wipe information SDd includes information indicative of a coloring start time, a coloring speed, and the like.

The text code information SDa, which is retrieved by the data separation unit 90, is supplied to the font data conversion unit 92 where each text code is converted into font data. The font data conversion unit 92 transfers the converted font data to a bit map control unit 91. The display/erase timing information SDc, the wipe information SDd, and the display position information SDb are also provided to the bit map control unit 91. The font data from the font data conversion unit 92 is converted to a character string and is arranged on the bit map in accordance with the display position information SDb. The character string is provided to the video signal processing circuit 75 via a synthesizing unit 98 during a period specified by the display/erase timing SDc.

The bit map control unit 91 performs a color processing of the character string according to the timing and speed indicated in the wipe information SDd. The speed information from the wipe information and the timing signal from the timing control unit 71 determine the speed of the coloring process. The timing signal varies according to the tempo set by the tempo switches 41*u* and 41*d*. Thus, the words displayed on the television monitor 60 may be colored at a different speed in accordance with the tempo of the music piece as well as the setting of the tempo switches 41*u* and 41*d*. However, the synchronization of the coloring and the music performance speed is maintained.

A performance control unit 95 displays a predetermined animation pattern during the introduction and intermission period. The performance control unit 95 comprises a timing detecting unit 96 for detecting the introduction and intermission period, a pattern control unit 97 for controlling pre-recorded animation patterns, and a synthesizing unit 98 for processing the output signals from the pattern control unit 97 and the bit map control unit 91.

When the text code contains the word "INTRODUCTION" or "INTERMISSION," the timing detection unit 96 instructs the pattern control unit 97 to display an animation pattern. Based on the display erase timing information, the timing detection unit 96 determines the time remaining for the introduction or intermission period (i.e., the time remaining before the start of the music performance). The pattern control unit 97 retrieves the time remaining information from the timing detection unit 96 animation patterns.

Figure 6A:
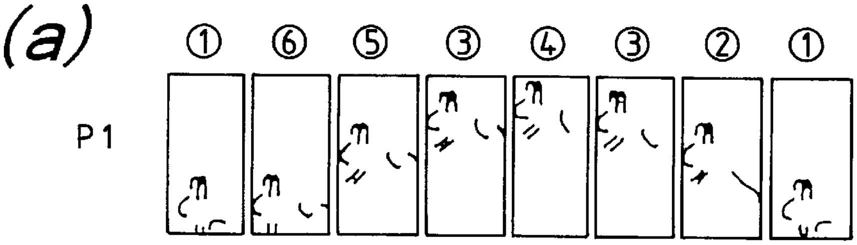
FIGS. 6(*a*) and (*b*) illustrate animation patterns used in the preferred embodiment of the invention.
Figure 6B:
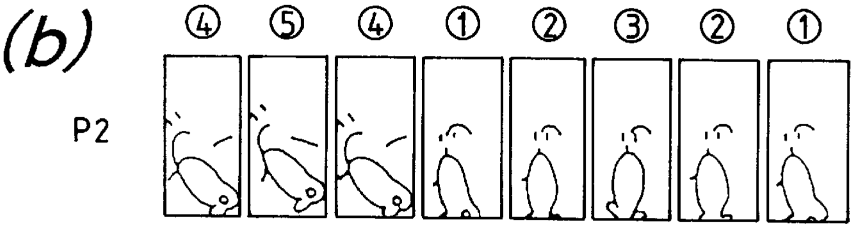
Figure 7A:
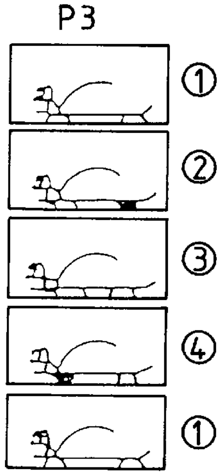
FIGS. 7(*a*) through (*d*) illustrate another set of animation patterns used in the preferred embodiment of the invention.
Figure 7B:
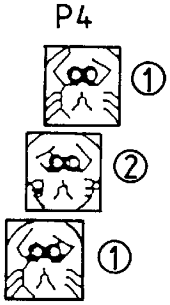
Figure 7C:
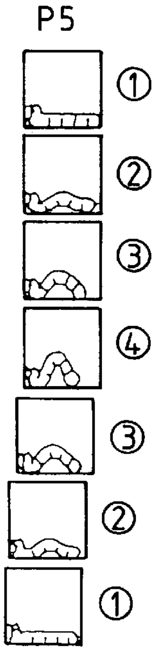
Figure 7D:
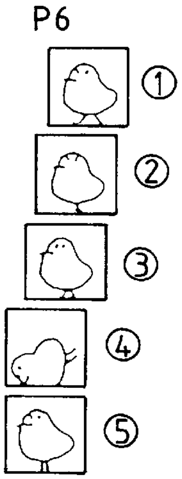

In the preferred embodiment, there may be a number of pre-recorded animation patterns. FIG. 6(*a*) shows an animation pattern of a hopping frog P1. This pattern consists of six different figures from P1-(1) to P1-(6). The frog pattern may be displayed from the right side to the left side of the screen by displaying the figures in the sequence of P1-(1)→P1-(2)→P1-(3)→P1-(4)→P1-(3)→P1-(5)→P1-(6)→P1-(1). The animation pattern P1 is obtained by sequentially changing and shifting the figures. The pattern repeats in the same sequence until the end of the introduction or the intermission period. The synthesizing unit 98 processes the pattern information and the character information from the bit map control unit 91. The processed information is supplied to the video signal processing circuit 75. As a result, an animation consisting of a hopping frog is displayed on the television monitor 60.

FIG. 6(*b*) shows an animation pattern of a walking penguin P2. There are five different figures from P2-(1) to P2-(5). The pattern is preferably displayed in the sequence of P2-(1)→P2-(2)→P2-(3)→P2-(2)→P2-(1)→P2-(4)→P2-(5)→P2-(4). The walking penguin P2 animation is obtained by changing and shifting the figures in the order stated above. After displaying the last figure, the pattern repeats in the same sequence.

FIGS. 7(*a*) and 7(*b*) show animation patterns of a crawling tortoise P3 and a crawling crab P4, respectively. FIG. 7(*c*) shows an animation pattern of a creeping caterpillar P5. FIG. 7(*d*) shows an animation pattern of a walking chicken P6. It is preferred that the vertical position of these animation patterns be constant, so that the figures are displayed on the same horizontal position. However, the horizontal position may be changed.

The crawling tortoise pattern P3 has four figures from P3-(1) to P3-(4). The figures are displayed in the sequence of P3-(1)→P3-(2)→P3-(3)→P3-(4)→P3-(1). Since there is no horizontal movement after completing the sequence (which constitutes one round), the display position of the pattern may shift to the left by a predetermined distance. The resulting animation shown on the monitor is a leg moving tortoise moving from the right to the left side of the screen.

The crawling crab pattern P4 has two figures P4-(1) and P4-(2), which are repeated in the sequence of P4-(1)→P4-(2)→P4-(1). Each figure is displayed by shifting the position to the left by a distance approximately equal to ¼of the width of one figure. The next round of the pattern starts from the last position of the previous round. Accordingly, a moving crab with various claw positions is shown on the screen.

The caterpillar pattern P5 consists of four figures from P5-(1) to P5-(4). The figures are displayed in the sequence of P5-(1)→P5-(2)→P5-(3)→P5-(4)→P5-(3)→P5-(2)→P5-(1). The display position of the first four figures does not change, but the last three figures gradually shift preferably to the left. The next round starts from the final position of the previous round. As a result, a moving caterpillar is shown on the screen.

The chicken pattern P6 consists of five frames from P6-(1) to P6-(5). The figures are displayed in the sequence of P6-(1)→P6-(2)→P6-(3)→P6-(4)→P6-(5). Figures P6-(1) to P6-(3) move gradually to the left. The figures P6-(4) and P6-(5) are preferably displayed at the same location. The next round starts from the final position of the previous round. Accordingly, an animation consisting of a walking chicken is shown on the screen.

Figure 8A:
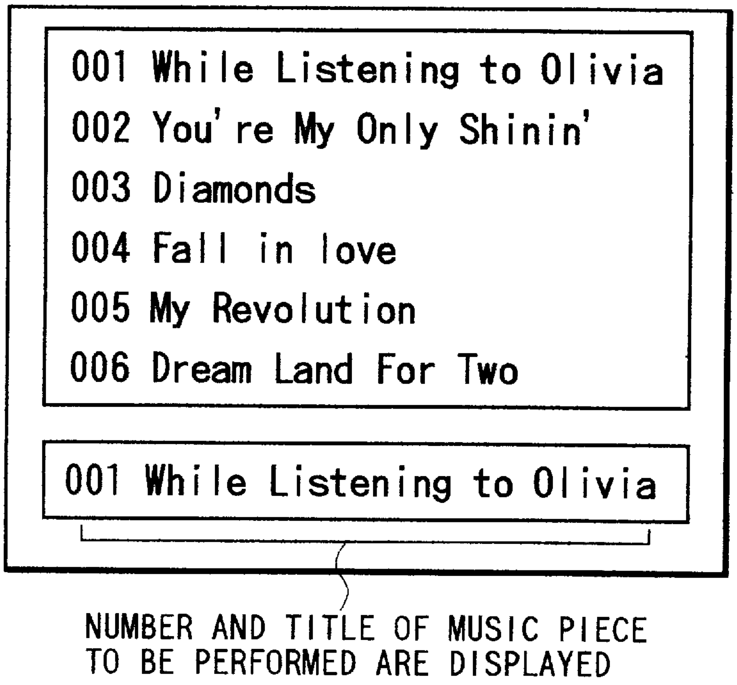
FIGS. 8(*a*) and (*b*) display a sample music selection menu on an output device and a built-in display unit of an apparatus, respectively.
Figure 8B:
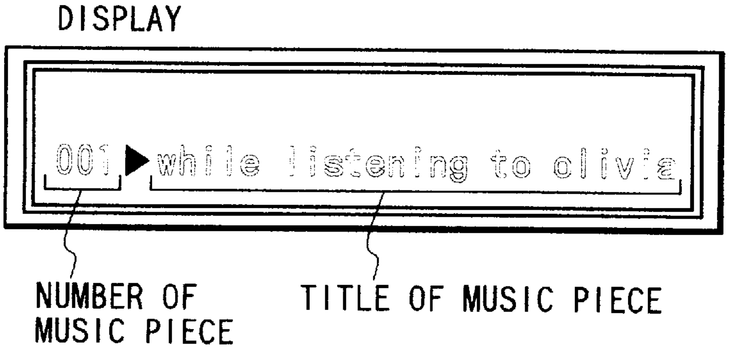

The operation of the karaoke apparatus according to the preferred embodiment of the invention will now be described. When the power switch 37 is first turned on, the data control unit 72 reads the title information (for television display) of the first six music pieces, including the pointers, from the ROM cartridge 50. The video signal control unit 74 converts the title information of these music pieces into text codes, and further converts them into corresponding font data. The video signal control unit 74 displays the font data on the television monitor 60, as shown in FIG. 8(*a*). First six lines of the screen are the titles of the music pieces with their respective numbers. In FIG. 8*a*, the title "While listening to Olivia" bearing the number "001" is initially selected. The selected title is highlighted (displayed brighter than the other titles). In the preferred embodiment, the lower part of the television monitor has a window for displaying the title for one music piece. Preferably, the lower window separately displays the highlighted title from the upper screen. For example, as shown in FIG. 8(*a*), the lower window displays the title "While listening to Olivia" bearing the music piece number "001." The data control unit 72 also reads the title information (for liquid crystal display) of the first music piece, including the pointer P.KFNK. The title information is supplied to the liquid crystal display unit 2. As shown in FIG. 8(*b*), the liquid crystal display unit 2 displays the number and the title (including foreign language characters, such as katakana characters) of the first music piece.

When a user rotates the selector knob 3, the control device produces pulse signals corresponding to the rotation amount of the selector knob 3. The pulse signals are then supplied to the system control unit 70. If the selector knob 3 rotates to the right by an amount corresponding to one pulse, the system control unit 70 instructs the performance control unit 72 to select the next music piece. As a result, the performance control unit 72 instructs the video signal control unit 74 to highlight the number and title of the second music piece (for example, "002 You're My Only Shinin"). The first line containing the number and the title of the first music piece is no longer highlighted. Concurrently, the lower window of the television screen displays the title of the second music piece. The data control unit 72 also reads the title information of the second music piece for the liquid crystal display from the ROM cartridge 50 and supplies the information to the liquid crystal display unit 2.

The continued rotation of the selector knob 3 further to the right selects the subsequent music piece. The highlighted portion of the television screen and the content of the liquid crystal display unit 2 are changed accordingly. When the sixth music piece is selected by further rotating the selector knob 3, the data control unit 72 reads the title information of the second through the seventh music pieces from the ROM cartridge 50 (for television display). Accordingly, the titles and corresponding number of the second through the seventh music pieces are displayed on the television screen, with the seventh music piece title highlighted. In other words, the screen of the television monitor 60 scrolls up by one line. The scrolling of the screen corresponds to the rotation speed of the selector knob 3. If the selector knob 3 rotates rapidly, the screen scrolls rapidly. Therefore, even a music piece located near the end of the music library may be easily selected by rapidly rotating the selector knob 3. Conversely, if the selector knob 60 rotates to the left, the line which is highlighted on the television screen sequentially shifts up, thus making the screen to scroll down.

When the start/stop button 4 is activated after selecting a desired music piece, the operation control unit 70 instructs the data control unit 72 to start the music performance. As a result, the data control unit 72 sequentially reads the music data at the addresses specified by the pointers in the ROM cartridge 50.

As shown in FIG. 8, when the start/stop button 4 is activated after selecting a music piece, such as the first music piece "While listening to Olivia," the data control unit 72 reads the music data of this music piece. The data separation control unit 73 separates the performance information from the music data and transfers the performance information to the MIDI signal processing circuit 76. The MIDI signal processing circuit 76 in turn produces a musical sound signal based on the performance information (or MIDI signal). If the selected music piece has an introduction section (i.e., a prelude), the musical sound signal corresponding to the introduction is supplied to the television monitor 60 via the audio signal processing circuit 77 and is produced through a loudspeaker.

Figure 9:
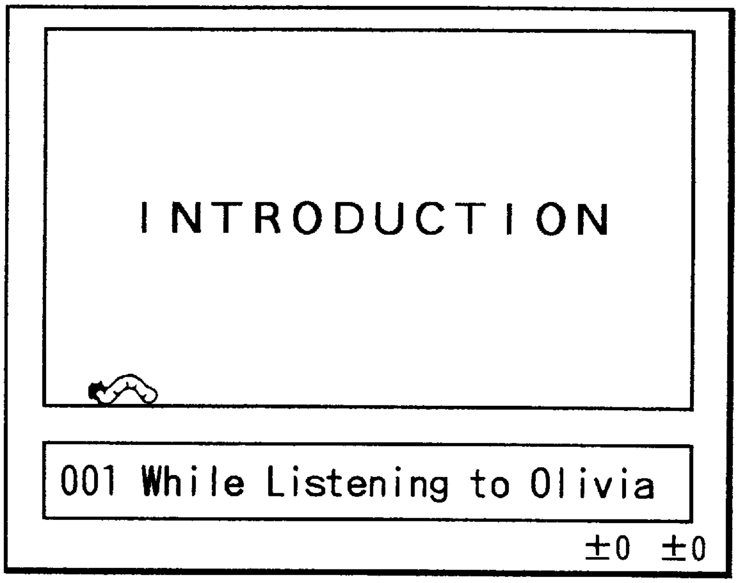
FIG. 9 is a sample display of an output device during an introduction period.

The word information portion of the music data read from the ROM cartridge 50 is supplied to the video signal control unit 74. The contents of the text code information SDa for the introduction (see FIG. 2(*b*)) are the characters comprising the word "INTRODUCTION." Accordingly, the font data conversion unit 92 converts the text code of the characters "INTRODUCTION" into font data. The word text bit map control unit 91 then converts the data received from the font data conversion unit 92 into a bit map. The bit map is then supplied to the video signal processing circuit 75 via the synthesizing unit 98, wherein the characters of "INTRODUCTION" are displayed on the screen of the television set 60, as shown in FIG. 9.

Figure 2A:
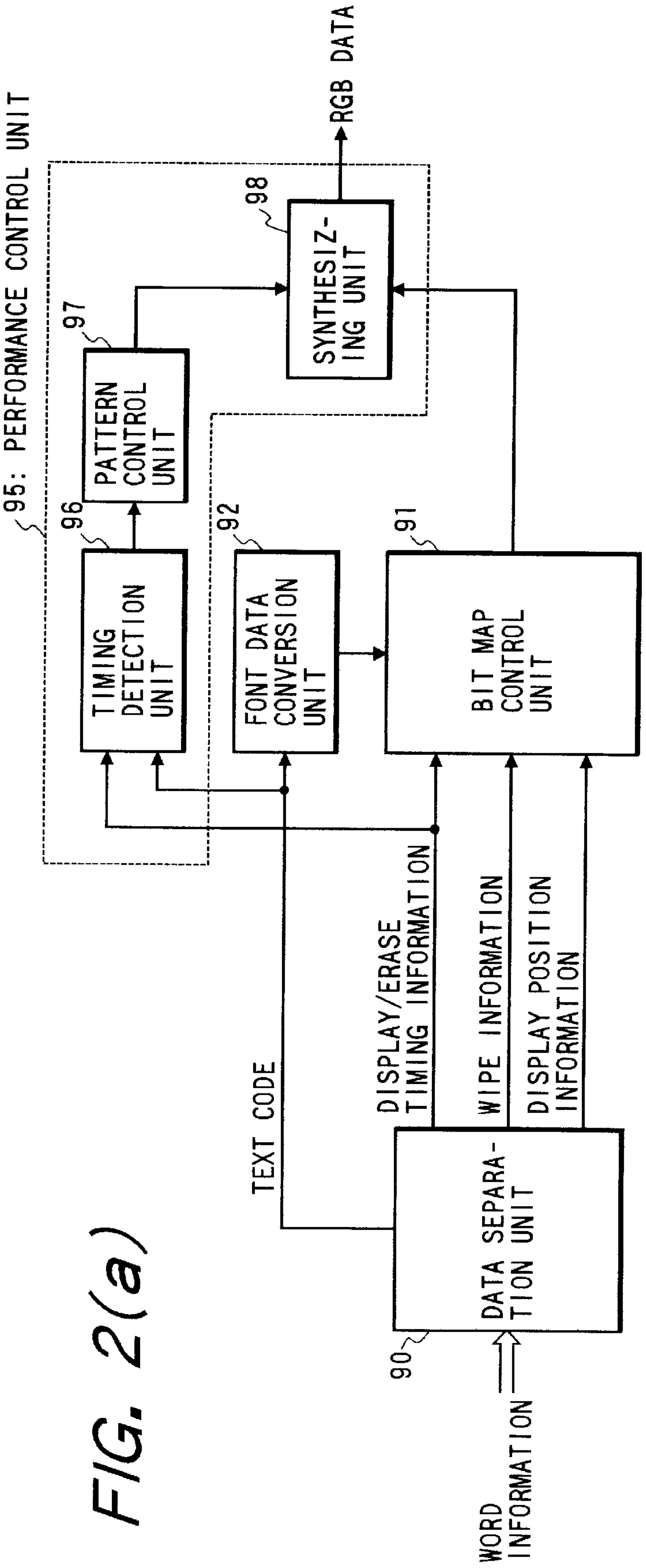
FIGS. 2(*a*) and(*b*) are block diagrams of a video signal control unit shown in FIG. 1.
Figure 2B:
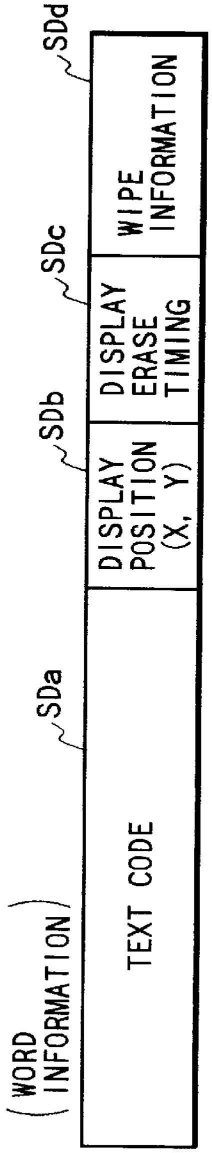

The timing detection unit 96 shown in FIG. 2, reads the text code, including the text code information SDa "INTRODUCTION," and also reads the selection code. Based on the selection code, the timing detection unit 96 instructs the pattern control unit 97 to display an animation pattern corresponding to the selection code. As a result, the pattern control unit 97 reads the pattern corresponding to the selection code and sequentially displays the animation patterns. For example, if the caterpillar pattern P5 is selected, the patterns P5-(1) through (4) are read in the sequence shown in FIG. 7(*c*). The bit map data of the patterns are provided through the synthesizing unit 98. The resulting display is shown in FIG. 9. The horizontal display positions of the patterns P5-(1) through (4) may be placed anywhere on the screen, including the lower portion of the screen where the song lyrics are displayed.

At the beginning of the introduction, the display speed of the patterns, such as the one shown in FIG. 7(*c*), is given an initial value. However, the display speed may change according to the amount of time remaining in either the introduction or intermission period. For example, when the time remaining information supplied from the timing detection unit 96 is equal to or less than a predetermined time period, the animation pattern control unit 97 increases the display speed of the patterns. In the preferred embodiment, the display speed in such a case may be calculated so that the animation pattern disappears from the edge of the screen when the time remaining nears zero. Since the moving speed varies among different patterns, the display speed circulation varies accordingly. When the display speed increases, the motion and moving speeds of the animation, such as the caterpillar patter P5, increase as well. Upon completion of the introduction period, the animation pattern disappears from the screen.

The operation of the preferred embodiment of the invention may be summarized as follows. When the word "INTRODUCTION" is displayed on the screen and the introduction melody is played, the user may recognize that the karaoke apparatus is in the introduction period. In addition to the word "INTRODUCTION," the user may also see an animation pattern, such as a crawling caterpillar, moving on the screen. As the end of the introduction period nears, the movement of the caterpillar accelerates. At the end of the introduction period (i.e., the beginning of the music performance), the animation pattern of the caterpillar disappears from the screen. Therefore, based on the movement of the animation pattern, the user can determine the end of the introduction and the beginning of the song.

Figure 10A:
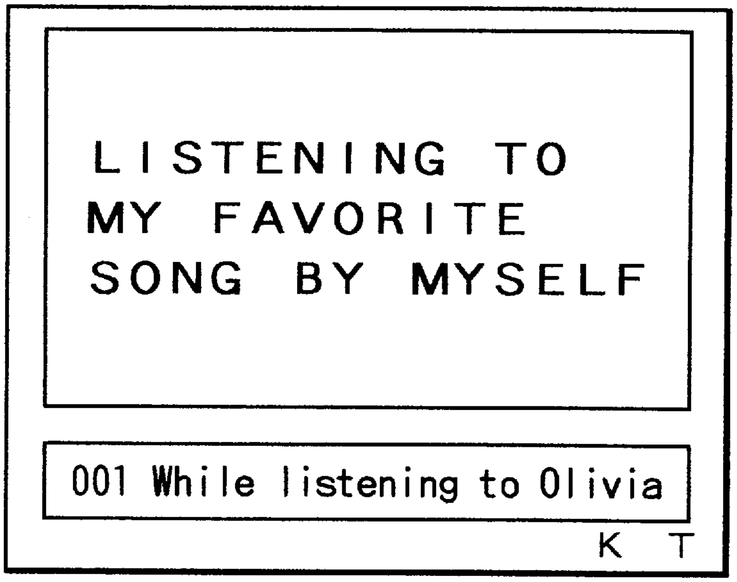
FIGS. 10(*a*) and (*b*) are sample displays during the performance.
Figure 10B:
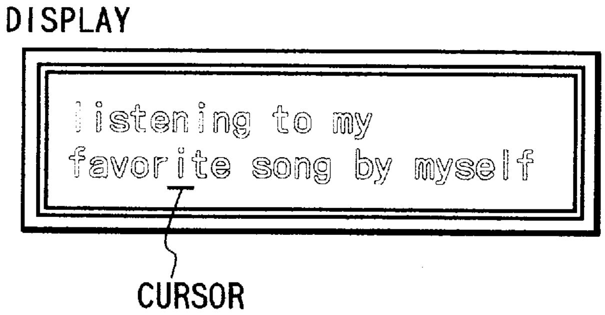

After the introduction period, the data control unit 72 reads the music data corresponding to the first phrase of a selected music piece. The word information, such as song lyrics, of the music data is supplied to the video signal processing circuit 75. The words are then displayed on the video screen, as shown in FIG. 10(*a*). The bit map control unit 91 colors the characters of the words, pursuant to the wipe information.

The data control unit 72 reads word information written in alphanumeric or foreign characters, such as katakana characters from the corresponding area in the ROM cartridge 50. The word information is then supplied to the liquid crystal display unit 2. It can be observed on the liquid crystal display that a cursor, which is shown under a word in FIG. 10(*b*), moves in according to the progress of the music piece being performed. Specifically in FIG. 10(*b*), the cursor is positioned under letter "i" of the word "favorite."

Figure 11:
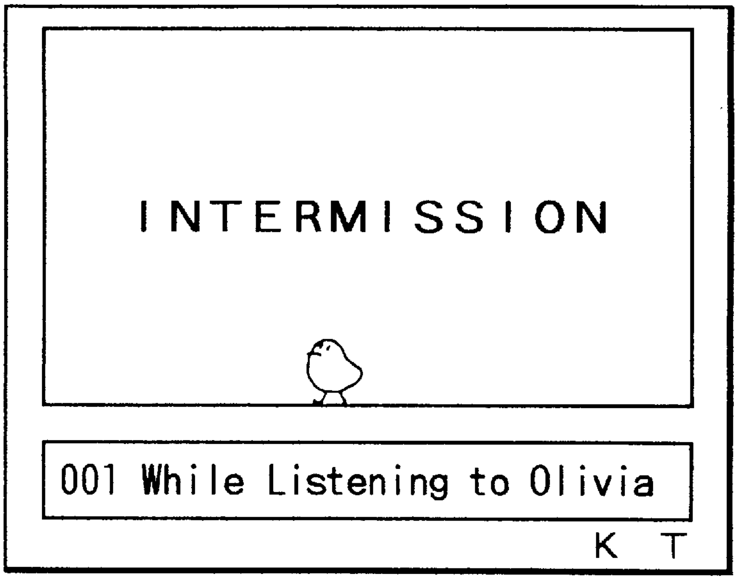
FIG. 11 is a sample display of an output device during an intermission period.

During an intermission period, the text code consisting of the word "INTERMISSION" is stored in the text code information SDa (see FIG. 2(*b*)) portion of the word information which is supplied to the video signal control unit 74. The timing detecting circuit 96 detects the text code for "INTERMISSION" and supplies an animation pattern display instruction to the pattern control unit 97. As a result, the pattern control unit 97 performs the same pattern display function as described above for the introduction period. Similar to the introduction period, an animation pattern is selected in accordance with the selection code. FIG. 11 is an example of the intermission display showing the animation pattern P6 of a chicken.

Alternative embodiments of the invention will now be described. During the intermission, the animation pattern movement may be accelerated when the time remaining for the intermission reaches zero. The acceleration may be controlled so that the animation pattern disappears from the edge of the screen at the end of the intermission. The accelerated movement may include the pattern movement and the display position of the pattern across the screen. Alternatively, the speed of the pattern movement may be controlled independent of the time remaining during introduction or intermission. The movement of the pattern may be implemented by changing the display speed of the pattern or by changing the control of the display coordinates. In the preferred embodiment, the pattern movement terminates at the end of the introduction or the intermission. In some cases, the user may already know or may be able to determine the beginning of the music. In addition, there are some systems that display the beginning portion of the song lyrics prior to the beginning of the music. In such cases, it may be unnecessary to synchronize the end of the intermission with the animation display. Accordingly, it may be sufficient to control the animation pattern to substantially match the ending of the intermission or the introduction.

In an alternative embodiment, the pattern selection code for selecting a desired animation pattern may be stored in an area other than the text code information SDa portion. Moreover, the animation pattern may be selected in a predetermined order or at random, or selected in accordance with the tempo of the music piece without using the animation selection code. In addition, a different format for the codes representing the words "INTRODUCTION" and "INTERMISSION" may be used. Consequently, one animation pattern may be selected in accordance with certain forms. For example, the use of stylized words "INTRODUCTION", "-INTRODUCTION-," and " INTRODUCTION" may correspond to the specific codes to choose certain animation patterns.

Figure 12:
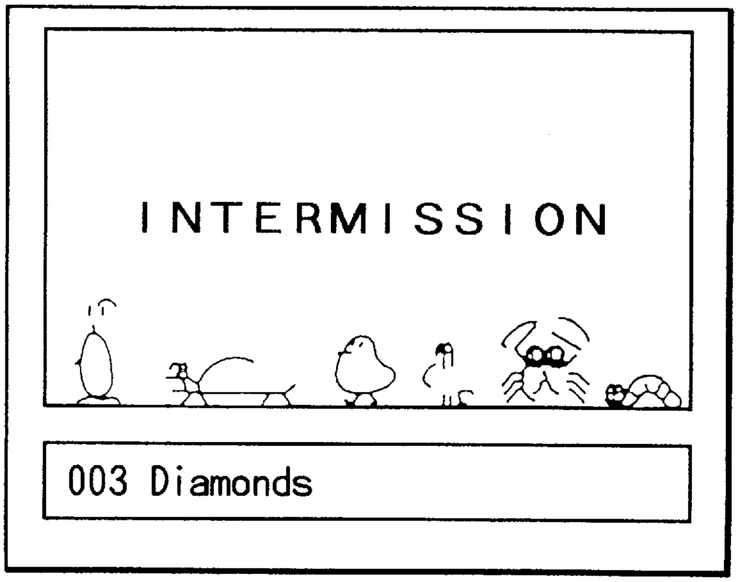
FIG. 12 is a sample display of animation patterns.

In an alternative embodiment of the invention, the animation pattern may move from right to left, or from bottom to top. Moreover, the animation pattern may be controlled so that it erases before reaching the end of the screen, or stops without being erased. It is important for the use of the apparatus that the change in the display condition represents the beginning of the music. The embodiment may be configured to simultaneously display a plurality of animation patterns. This may be accomplished either by activating a plurality of performance control units 95 (see FIG. 2(*a*)) in parallel, or by driving the performance control unit 95 in a time division multiplex manner. For example, FIG. 12 shows an example in which six animation patterns are simultaneously displayed.

It is also possible to detect the introduction or the intermission period by the presence or absence of the wipe information. For example, since the character code of "INTRODUCTION" or "INTERMISSION" need not be wiped, the wipe information may not be present. The absence of the wipe information signifies that the apparatus is either in the introduction or in the intermission period. The operation control unit 70, the timing control unit 71, the data control unit 72, and the data separation control unit 73 may be implemented in one integrated circuit by using a microprocessor or other suitable devices.

The preferred embodiments of the invention may be manufactured at lower costs because the hardware for producing image data from a storage medium, such as a laser disk, is not needed. Nonetheless, attractive animation patterns may be displayed. The added benefit is that the animation pattern may be synchronized with the beginning of the music. Also, if there are a plurality of animation patterns, a display that matches the words and contents of a music piece may be selected in accordance with animation selection codes or specific codes in the word information.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An apparatus for reproducing music programs and suitable for use as a sing-along apparatus, the apparatus comprising:

- a word data storage device that stores word data of a plurality of the music programs, wherein the word data includes a word code indicative of words for a segment of a music program;
- a performance data storage device that stores performance data of the music programs;
- a data retrieving device that reads the performance data and the corresponding word data;
- a display signal producing device that has at least one display pattern, wherein the display signal producing device produces a display signal comprising an animated display of a selected display pattern of the at least one display pattern;
- a display control device that activates the display signal producing device pursuant to the word code;
- a performance signal producing device that produces a performance signal based on the performance data received from the data retrieving device; and
- a word signal producing device that produces a word display signal based on the word data,
- wherein the display control device activates the display signal producing device to display the selected display pattern when the word code contains no words.

2. An apparatus according to claim 1, wherein each display pattern of the at least one display pattern includes a plurality of figures, wherein the display signal producing device compiles the figures in a predetermined sequence to produce the animated display.

3. An apparatus according to claim 2, wherein the display signal producing device controls the display position and the display sequence of the selected display pattern of the at least one display pattern.

4. An apparatus according to claim 3, wherein the word data storage device and the performance data storage device include a read-only-memory.

5. An apparatus according to claim 3, wherein the word data further includes a selection code which is used by the display signal producing device to choose a display pattern from the at least one display pattern.

6. An apparatus according to claim 5, wherein the display control device activates the display signal producing device based on the selection code.

7. An apparatus according to claim 6, wherein the display signal producing device selects any combination of display patterns from the at least one display pattern pursuant to the selection code.

8. An apparatus for reproducing music programs and suitable for use as a sing-along apparatus, the apparatus comprising:

- a word data storage device that stores word data of a plurality of the music programs, wherein the word data includes a word code indicative of words for a segment of a music reprogram, and a time code indicative of a time remaining;
- a performance data storage device that stores performance data of the music programs;
- a data retrieving device that reads the performance data and the corresponding word data;
- a display signal producing device that has at least one display pattern, wherein the display signal producing device produces a display signal comprising an animated display of a selected display pattern of the at least one display pattern;
- a display control device that activates the display signal producing device pursuant to the word code and the time code;
- a performance signal producing device that produces a performance signal based on the performance data received from the data retrieving device; and
- a word signal producing device that produces a word display signal based on the word data,
- wherein the word display signal is produced for a period specified in the time code, and the display control device activates the display signal producing device to display the selected display pattern when the word code contains no words.

9. An apparatus according to claim 8, wherein each display pattern of the at least one display pattern includes a plurality of figures such that the figures displayed in a predetermined sequence produces the animated display.

10. An apparatus according to claim 9, wherein the display signal producing device controls the display position and the display sequence of the selected display pattern of the at least one display pattern.

11. An apparatus according to claim 10, wherein the display control device instructs the display signal producing device to accelerate the display sequence of the at least one display pattern as the time remaining nears zero and to terminate the display signal when the time remaining equals zero.

12. An apparatus for reproducing music programs and suitable for use as a sing-along apparatus, the apparatus comprising:

a word data storage device that stores word data of a plurality of the music programs, wherein the word data includes a word code indicative of words for a segment of a music program, and a time code indicative of a time remaining, and a wipe-out code that contains erasure information of the word data;

a performance data storage device that stores performance data of the music programs;

a data retrieving device that reads the performance data and the corresponding word data;

a display signal producing device that has at least one display pattern, wherein the display signal producing device produces a display signal comprising an animated display of a selected display pattern of the at least one display pattern;

a display control device that activates the display signal producing device pursuant to the time code and the wipe-out code;

a performance signal producing device that produces a performance signal based on the performance data received from the data retrieving device; and a word signal producing device that produces a display signal based on the word data, wherein the word signal is produced for a period specified in the time code, and the display control device activates the display signal producing device to display the selected display pattern when the word code contains no words.

13. An apparatus according to claim 12, wherein the erasure information of the wipe-out code provides information to the display signal producing device to change the appearance of already performed word data of the music program.

14. An apparatus according to claim 13, wherein the display control device activates the display signal producing device when the wipe-out code is not present.

15. An apparatus according to claim 14, wherein the display control device instructs the display signal producing device to accelerate the movement of the at least one display pattern as the time remaining nears zero and to terminate the display signal when the time remaining equals zero.

16. An apparatus for reproducing music programs from performance data and suitable for use as a sing-along apparatus, the apparatus comprising:

word data for a plurality of the music programs, wherein the word data includes a word code indicative of words for a segment of a music program;

a display signal producing device that has at least one display pattern, wherein the display signal producing device produces a display signal comprising an animated display of a selected display pattern of the at least one display pattern; and a display control device that activates the display signal producing device pursuant to the word code, wherein the display control device activates the display signal producing device to display the selected display pattern when the word code contains no words.

17. An apparatus according to claim 16, wherein each display pattern of the at least one display pattern includes a plurality of figures such that the figures displayed in a predetermined sequence produces the animated display.

18. An apparatus according to claim 17, wherein the display signal producing device controls the display position and the display sequence of the selected display pattern of the at least one display pattern.

19. A method for manufacturing an apparatus for reproducing music programs and suitable for use as a sing-along apparatus, the method comprising the steps of:

storing word data of a plurality of the music programs in a word data storage device, wherein the word data includes a word code indicative of words for a segment of a music program, and a time code indicative of a time remaining, and a wipe-out code that contains erasure information of the word data;

storing performance data of the music programs in a performance data storage device;

reading the performance data and the corresponding word data;

providing a display signal producing device that stores at least one display pattern;

activating the display signal producing device pursuant to the time code and the wipe-out code;

producing a display signal comprising an animated display of a selected display pattern of the at least one display pattern;

activating the display signal producing device to display the selected display pattern when the word code contains no words;

producing a performance signal based on the performance data; and producing a word display signal based on the word code, wherein the word display signal is produced for a period specified in the time code.

20. A method according to claim 19, further comprising the step of activating the display signal producing device when the wipe-out code is not present.

21. A method according to claim 20, further comprising the step of instructing the display signal producing device to accelerate the movement of the at least one display pattern as the time remaining reaches zero and to terminate the display signal when the time remaining equals zero.

22. A method according to claim 21, further comprising the step of providing a plurality of figures for each display pattern of the at least one display pattern such that the figures displayed in a predetermined sequence produces the animated display.

* * * * *